Nov. 12, 1963 A. PHILLIPS 3,110,086
COINING STRUCTURAL PARTS
Filed Feb. 15, 1960 7 Sheets-Sheet 1
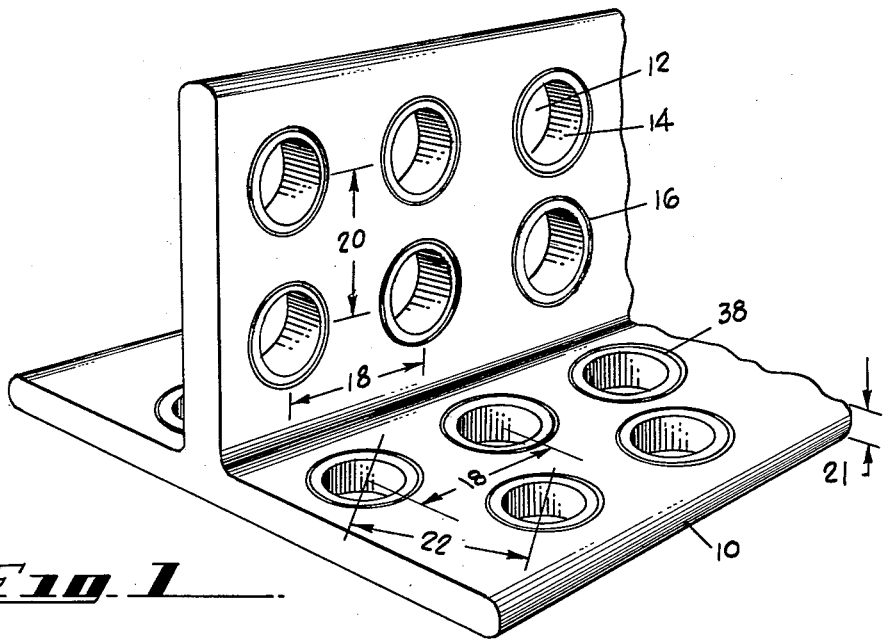
Fig. 1
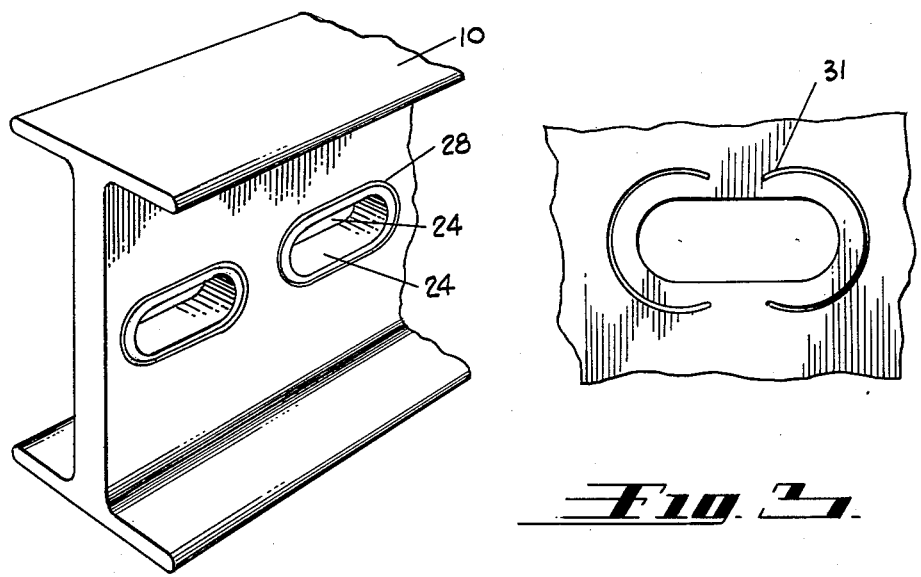
Fig. 2
Fig. 3
INVENTOR.
AUSTIN PHILLIPS
BY
Edwin Coates
ATTORNEY.

Nov. 12, 1963 A. PHILLIPS 3,110,086
COINING STRUCTURAL PARTS
Filed Feb. 15, 1960 7 Sheets-Sheet 2

INVENTOR.
AUSTIN PHILLIPS
BY
Edwin Coates
ATTORNEY

Nov. 12, 1963 A. PHILLIPS 3,110,086
COINING STRUCTURAL PARTS
Filed Feb. 15, 1960 7 Sheets-Sheet 3

INVENTOR.
AUSTIN PHILLIPS
BY
Edwin Coates
ATTORNEY.

Nov. 12, 1963   A. PHILLIPS   3,110,086
COINING STRUCTURAL PARTS
Filed Feb. 15, 1960   7 Sheets-Sheet 4

INVENTOR.
AUSTIN PHILLIPS
BY Edwin Coates
ATTORNEY.

INVENTOR.
AUSTIN PHILLIPS
BY Edwin Coates
- ATTORNEY -

Nov. 12, 1963  A. PHILLIPS  3,110,086
COINING STRUCTURAL PARTS
Filed Feb. 15, 1960  7 Sheets-Sheet 6
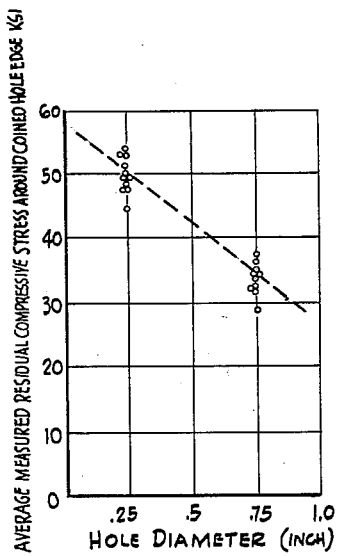
_Fig. 15._
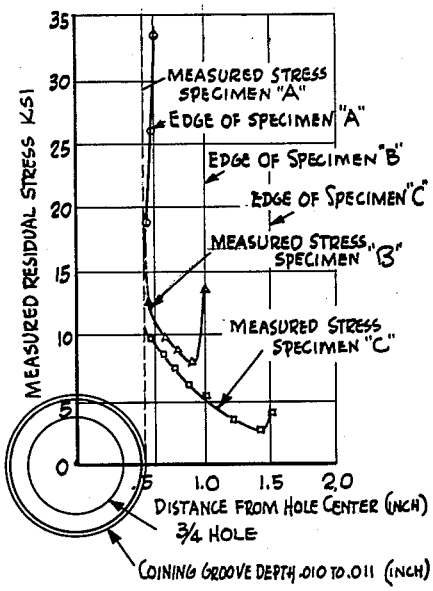
_Fig. 18._
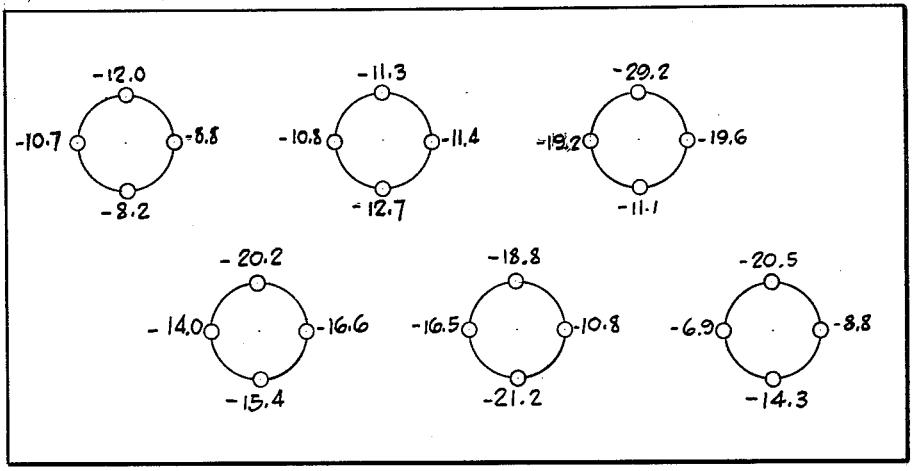
_Fig. 16._
INVENTOR.
AUSTIN PHILLIPS
BY
Edwin Coates
-ATTORNEY- Nov. 12, 1963     A. PHILLIPS     3,110,086
COINING STRUCTURAL PARTS
Filed Feb. 15, 1960     7 Sheets-Sheet 7
MEASURED RESIDUAL STRESS KSI AT COINED HOLE EDGE ON MATERIAL SURFACE
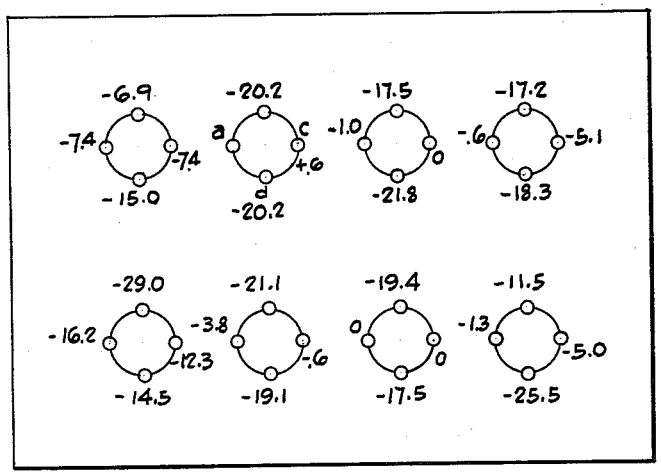
*Fig. 17.*
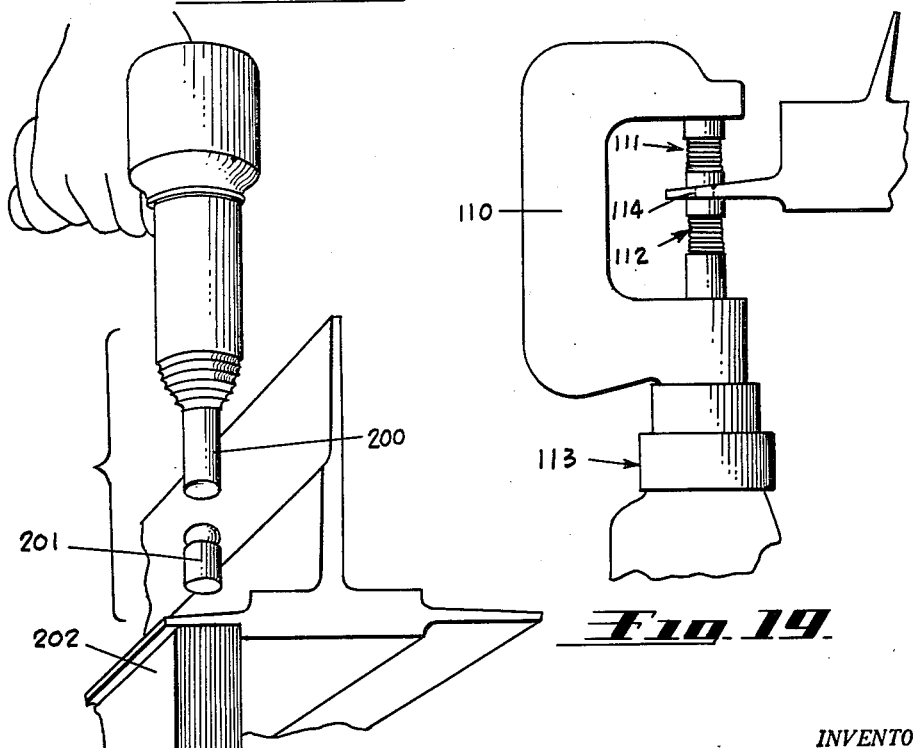
*Fig. 19.*
*Fig. 20.*
INVENTOR.
AUSTIN PHILLIPS
BY
Edwin Coates
ATTORNEY.

3,110,086
COINING STRUCTURAL PARTS
Austin Phillips, Los Angeles, Calif., assignor to Douglas Aircraft Company, Inc., Santa Monica, Calif.
Filed Feb. 15, 1960, Ser. No. 8,829
4 Claims. (Cl. 29—155)

This invention relates to stressed structural members composed of metallic alloys. It is particularly concerned with, though not exclusively limited to, aircraft structural parts composed of aluminum and its alloys.

Such structural parts incorporate lightening holes, bolt holes, fuel transfer holes and other apertures, edge notches, and other interruptions in the continuity of the single piece metallic part. At these hiatuses, when the part is put under strain, there occur such intensifications of unit-stress or stress-concentration that the probabilities of fatigue failure at these apertures are enhanced manifold times by the presence of the apertures. This obtains particularly in aircraft, wherein the parts undergo multitudinous repeated cycles of strain incident to repeated operating loads, to aircraft vibrations and to flight stresses applied to these parts.

The present invention provides means, configurations and methods predicated upon novel concepts which ameliorate this situation appreciably and lengthen the fatigue life of such parts to render them "fatigue-worthy" to a more useful degree.

Boadly considered, the present invention is predicated upon the concept of so pre-stressing the metal in the critical surface of the hole-wall and in a critical area surrounding same that the most commonly encountered stresses in aircraft, namely, tensile stress, will not set up excessive fatigue therein under any number of cycles of any tensile force anticipatable. It has also been ascertained that there occurs no undesirable increase in the hardness of the hole-wall, by virtue of the application of the present pre-stressing invention thereto, so that embrittlement incident to previous proposals is entirely obviated.

Essentially, the invention provides the hole, notch or other hiatus in a structural member with radially and circumferentially directed residual stresses, or pre-stress, by means of a groove, arcuate in cross-section, formed adjacent to the hiatus, the formation of the groove causing displacement of metal toward the center of the hiatus. This groove is not to be formed by removal of metal, as by machining, electrical erosion or chemical etching, but rather is formed by die-stamping, explosion-forming, or by squeezing. Whatever the shape of the hiatus may be, the invention, by forming a groove adjacent it, and circumscribing it, involves the displacement of metal toward the center of the hiatus from all edges, or from the entire periphery, thereof. It is believed that there occurs no densification of the metals, compaction of its crystalline structure, or the like. The metal adjacent the hiatus is simply displaced centripetally so much so that it is usually necessary to ream out the hole somewhat to return it to its original diameter.

In addition to the aforestated consequences or actions achieved by subject invention, it greatly decreases the possibility of stress-concentration occuring at the hiatus. It also effectively restores the original or "parent metal" properties heretofore destroyed in the formation of the hole. It further constrains the fatigue-crack nucleus to relocate itself so distant from the hole and outwardly radially therefrom, that if tensile fatigue failure should occur, it occurs more frequently outwardly beyond the edge of the hole, in contradistinction to subsistent hole fatigue failures.

It has been ascertained that the invention is also operative to relieve spot welds of stress concentration, thus to prolong their fatigue life. It can also be employed on smaller pilot holes to be enlarged to full size and around countersunk apertures, such as countersunk bolt or rivet holes.

The groove does not necessarily have to be precisely concentric with the hole and may be just slightly eccentric to the hole, either laterally or vertically without thereby losing all the benefits of the invention. Preferably, the invention is employed chiefly to augment the tensile fatigue life of an apertured part rather than to enhance its other strength factors.

Partially fatigue apertured pieces can also be rehabilitated by means of the present invention and are thereby effectively restored to their pristine condition.

It is preferred that the apertured piece be treated according to subject invention before anodizing of the piece when such piece is to be so processed. However, if performed after anodizing, the exposed spots may be touched up with Alodine, the trade name of American Paint & Chemical Co., Ambler, Pa., for a metal-protective chromate-conversion coating widely known in the industry.

If the hiatus is circular in cross-section or plan, the groove will also be circular or at least circumscribing in nature. If the hiatus is elliptical or oval, there may be provided a concentric ellipse or oval surrounding the slot; or, if preferred, two horseshoe-shaped grooves may be employed, one embracing each end of the ellipse. If the hiatus is a notch or crack in the edge of the structural part, the groove parallels the edge of the part, and arrests the progression of the crack. The present grooving combination provides a type of residual stress that, although stressed metal is usually more susceptible to stress-corrosion cracking than unstressed metal, is of such a nature of stress (compression) that it is not rendered susceptible to this mechanism of corrosion attack.

If the metal part is rather thin, the hiatus is "grooved" only on the one major face of the part. If the part is thicker, both faces have the grooving adjacent the hiatus.

The aforedescribed critical relationships between the various variables that enable the coining groove to establish residual compressive stress at the hole edge were derived empirically, or by ordinary fatigue tests, conducted along the lines of the aforesaid basic concepts. By means of photoelastic stress studies made of certain other tests involving additional variables, however, certain other and additional critically inventive relationships between variables, all having to do with the successful functioning of the inventive concepts, have been also established, as will be immediately made manifest.

Photoelastic stress studies, that is photographs of the isochromatic fringes which by different colorings, indicate different levels and locations of stress distribution in a member, have, in addition to the aforestated ordinary fatigue test methods, demonstrated that the radially and circumferentially directed compression prestress at the coined hole edge also varies with the ratio of the width of the specimen to groove diameter, to the width and to the thickness of the structural part itself, as shown hereinafter. With a given ratio of hole diameter to groove diameter the compressive pre-stress varies as a function of the groove depth and groove width.

This beneficial pre-stress also varies inversely with the diameter of the groove-surrounded hole. It further varies inversely with the distance between the edge of the hole and the radially nearest edge of the groove. Further, this pre-stress varies with the pattern of the arrangement of the holes with reference to each other.

It will also be demonstrated that certain critical relationships arise that relate to the residual stress just outside the groove and at the very edge of the specimen arising from variations in the width of the specimen itself or from the ratio of the specimen width to the diameter of the coined groove, employing the circular center line of the annular groove as the outer limits.

It will be shown that as this ratio increases, this undesirable edge-stress drops materially, with a given diameter of hole and thickness of specimen.

The invention is also embodiable around the peripheral margin of such articles as aircraft window frames as well as around apertures in an elongated, or other, structural component. This "edge-coining" of these margins has the effect of preventing the formation or propagation of edge-nicks or notches.

It can, further, be applied to a part in which a crack or fissure has already developed, in such a mode that the groove circumscribes or encompasses the crack and in such case it effectively prevents the propagation of the crack.

In order to render the inventive concepts more concrete, several embodiments thereof are depicted in the accompanying drawings and are described hereinafter in conjunction therewith.

In these drawings:

FIG. 1 is a fragmentary perspective view of a structural member provided with circular lightening holes, or bolt holes, the member being relieved of stress concentrations at these apertures by means of the teachings of this invention;

FIG. 2 is a fragmentary perspective view of another structural member incorporating elongate apertures, or slots, for the passage of fuel, oil, other liquids, conduitry, fasteners, etc., the structural member having its fatigue life augmented by means of the metal-working and hole-wall pre-stressing concepts and formations of the present invention;

FIG. 3 is a fragmentary plan view of a structural member having a slot, or elongate aperture therein which is prevented from concentrating stresses, and the fatigue life of which is enhanced, by another configuration of metal-displacing grooving, here shown as a cooperative pair of "horseshoe" shaped grooves;

Figure 4:
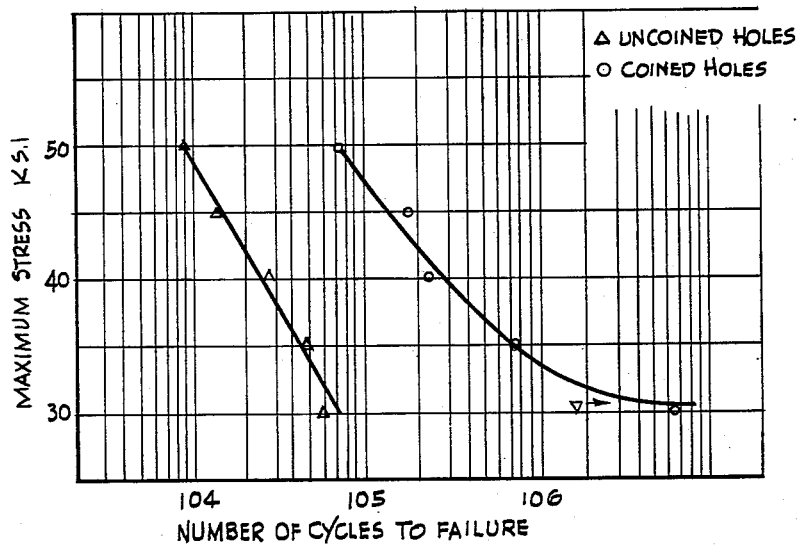
Figure 5:
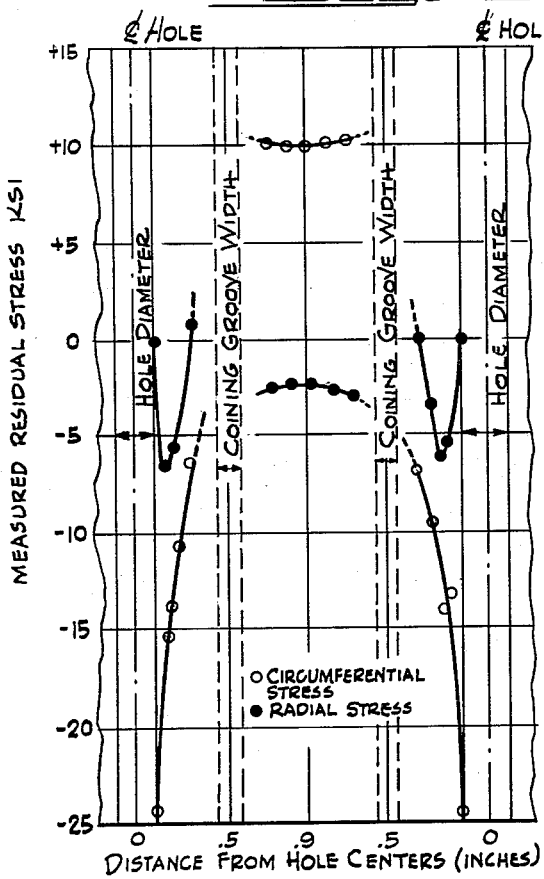
Figure 5:
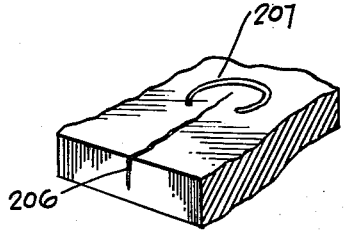
Figure 6:
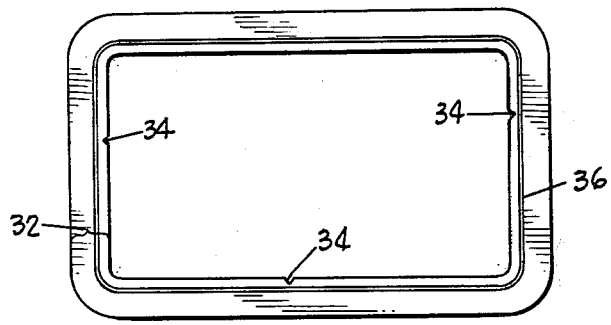
Figure 8:
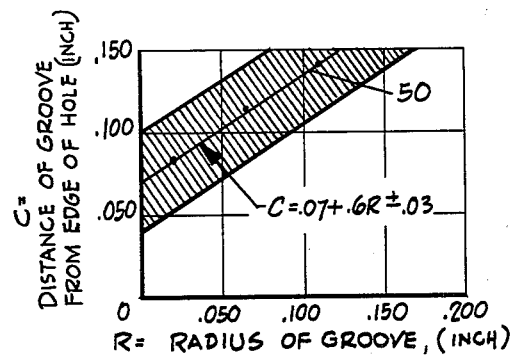
Figure 9:
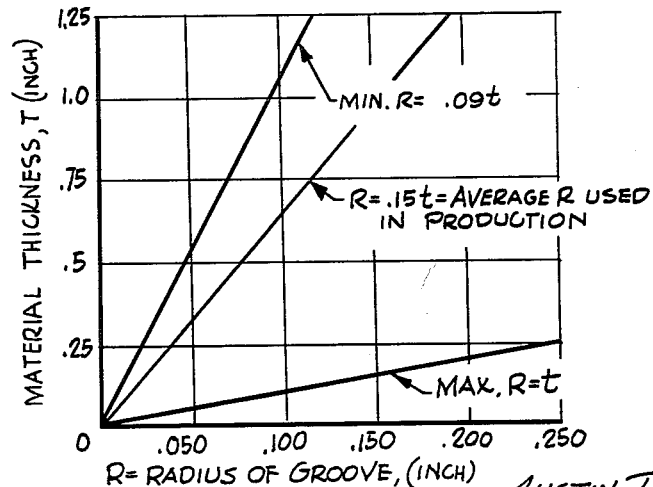
Figure 7:
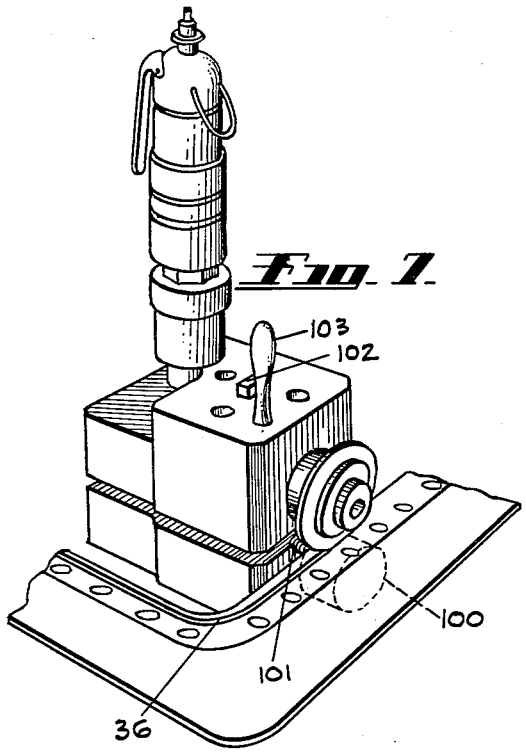
Figure 13:
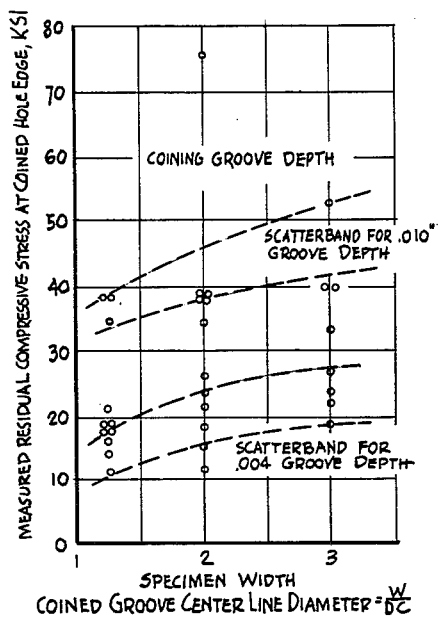
Figure 14:
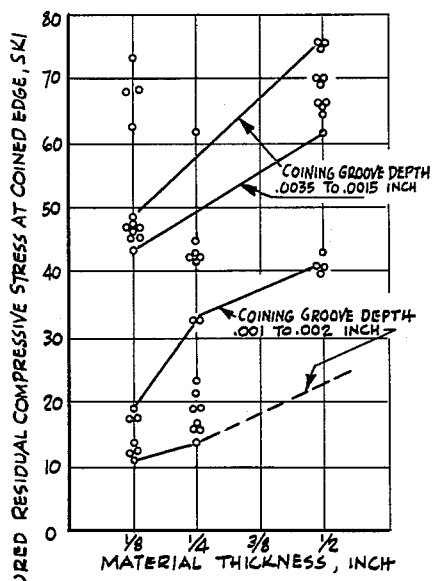
Figure 12:
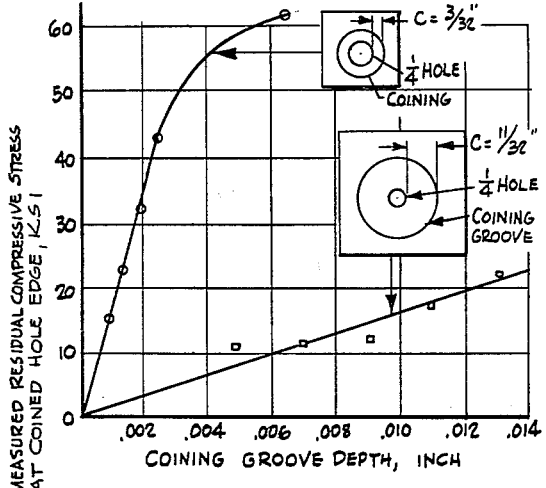
Figure 10:
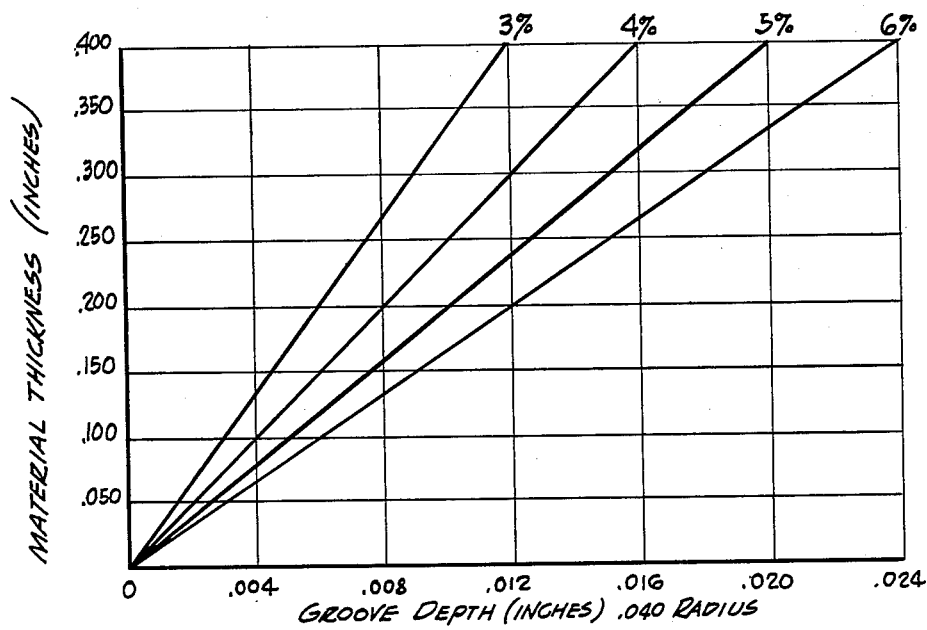
Figure 11:
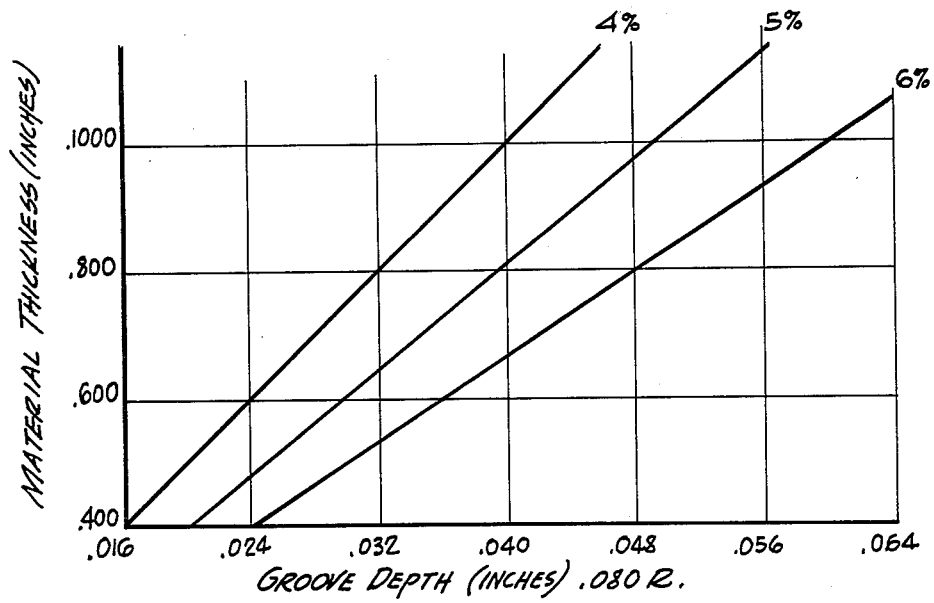

FIG. 4 is a graph representing cycling to failure of several holes which have been uncoined, shown to the left, the right hand curve showing holes fatigued to 50% of life and 75% thereof and then coined and rehabilitated and cycled, the rhombuses showing holes fatigued 50%, the inverted triangles 75%. The circles represent virgin coined holes;

FIG. 5 is a graph-sectional view, presenting the relationship between hole diameters, pre-stressing groove widths, radial and circumferential stresses between the hole walls, distances from hole centers and measured residual stresses between a pair of round holes each having a circular groove in combination therewith;

FIG. 6 is a plan view of an airplane window frame provided with a preventive or precautionary edge-groove to reinforce the edge and to prevent cracks from emanating from such nicks, notches, or other hiatuses that may develop during use or be accidentally made in the inner edge of the frame in its installation or maintenance;

FIG. 7 is a perspective view of one form of tool for edge-grooving structural members;

FIG. 8 is a graph presenting the optimum relationships to be maintained, in all grooving herein, between the radius of the groove and the distance of its inner periphery from the edge of the hole in the structural member giving line 50 as the line of optimums;

FIG. 9 is a graph exhibiting the maximum, minimum and average relationships to be maintained between the radius of the groove and the thickness of the piece;

FIG. 10 is a graph presenting the relationships between the groove depth and the material's thickness for four "scatter" conditions, all departing from the optimum relationships thereof by the percentages shown, and with a groove radius of .040 inch;

FIG. 11 is a graph similar to that of FIG. 9 with a groove radius of .080 inch, showing scatters of three different percentages;

FIG. 12 is a graph representing the effects of the distances between the edge of the hole and the inner periphery of the groove, at various depths of this groove;

FIG. 13 shows the effect of the ratio of the member's width to the groove's diameter on the residual stress;

FIG. 14 depicts the effect of variations in the thickness of the structural member on the residual stress at the hole edge, two sets of arbitrary values of groove depth having been chosen;

FIG. 15 illustrates the effect upon residual stress of variations in hole-diameter, the groove having a fixed arbitrary value;

FIG. 16 is a plan-diagram, including measured residual stresses at various loci on the holes' edges, in a staggered, parallel line pattern or arrangement of holes;

FIG. 17 is a view similar to that of FIG. 16 in which the holes are not staggered, instead being aligned two-by-two transversely of sheet in parallel lines;

FIG. 18 depicts graphically the effect of the variations in specimen width on the residual stresses established just outside the groove, a ¾ inch hole and a groove depth of about .011 inch having been chosen; and the distance from the hole center being the abscissa;

FIG. 19 diagrammatically represents the "squeeze-die" type of tool, for impressing a groove around a circular hole;

FIG. 20 represents a more or less conventional impact or stamping die for one-side grooving around circular holes, and FIG. 21 illustrates the inception of a crack or fissure the propagation of which has, by means of the application of a "horseshoe" groove, been halted and stabilized.

The various configurations, conformations and graphic data shown in the drawings are predicated upon certain laws or rules discovered by me as connecting the variables and also being predicated upon certain mutual relationships of these variables that were empirically ascertained by physical and metallurgical tests.

More specifically, at and around an aperture or crack that has not been provided with the groove-induced pre-stressing of the present invention, any applied tensile, radiating stress on the article or part is concentrated at the aperture, etc., which then constitutes the nucleus of fatigue failure that may result from repeated tension loads applied to the part.

However, by providing the apertured wall and the adjacent area with radiating, residual compressive, or negative, stresses of a value pre-calibrated with the load the article is expected to carry, the resultant net effective tensile fatigue-inducing stress coming to bear upon the aperture is greatly reduced. So far is it minimized, in fact, that the nucleus of fatigue failure is usually thereby shifted to a point, line or other locus lying entirely outside the confines of the groove.

The effectiveness of this mode and manner of creating residual, compressive pre-stress resides in the fact that when a tension load is applied to the article so stressed the positive tensile stress in the surface layer of the article is reduced by the exact amount of the applied compressive or negative pre-stress. Since failure originates from tensile stress, it follows that the fatigue-durability of this same surface layer, and consequently of the entire article, is materially and effectively augmented by means of the present invention.

The invention is based upon the scientific fact that if a thin, outer "shell" or "skin" or surface region of a member that is to be subjected to bending, or tension, has a residual compressive stress created in this shell, then when the maximum tensile load is applied, the resultant stress is effectively reduced therein, thus increasing its fatigue life. Surface cold-rolling, tumbling and shot preening have heretofore been employed for establishing this residual compressive stress but the use of grooving has never heretofore been contemplated.

Assuming that the structural member is composed of an aluminum alloy and will be subjected to either intermittent cycling or continuous strains in an aircraft, the following relationships of the grooving of this invention obtain, all dimensions given being in inches:

(1) The optimum radius of the pre-stressing arcuate cross-section groove is to vary directly with the thickness of the structural member, and ideally R should equal $.15t$ where R is the radius of the groove and $t$ is the material's thickness, but a degree of advantage is still obtained by a minimum of $R=.09t$ up to a maximum of $R=1.0t$.

(2) With a given such radius, the depth of the groove also is varied directly as the thickness of the material varies; however, if the groove is made too deep for a thin member, such member will be susceptible to cracking and even if the groove depth exceeds a certain amount in even the thickest material there will be appreciable distortion. If the groove is too shallow for a very thick piece, there will be no worth while improvement in fatigue life. Preferably, P, the groove depth equals $(.045\pm.015)t$, $t$ being the material's thickness;

(3) The distance "C" of the groove from the hole's edge, whether the latter be circular, oval, or notch, nick, or re-entrant damage, varies as a linear function of the radius of the groove, as follows: $C=.07+.6R\pm.03$, where R is the radius of the groove.

(4) The depth of a groove of a given radius, and the distance thereof from the hole's edge determine the residual stress induced radially and circumferentially of the hole's wall by the groove.

First considering the use of the invention and of the aforestated rules, to augment the life of a member 10 incorporating a plurality of circular apertures 12 therein, as depicted in FIG. 1, the wall 14 of each hole is pre-stressed both radially and circumferentially by means of metal displaced toward the wall from an annular area 38. This displacement occurs as a result of forming a circular, concentric groove 16 around the hole. Groove 16 is located a distance from wall 14 which is a linear function of the radius of the groove as set forth in the foregoing equation. FIG. 9 demonstrates graphically that the groove's radius is varied in linear, direct proportion to the thickness of the structural member 10 in accordance with the formula set out in (1) above. It has been determined empirically that said thickness may well range from .050 inch to about 1.5 inch—the practicable thickness range—without loss of any of the advances contemplated herein and with considerable efficacy. However, in the range of .050 inch to .067 inch it is necessary to groove only the one major face of the structural member in order to achieve the results sought.

In addition to the radius of the groove the depth of groove 16 also is a true linear function of the material's thickness as graphically shown in FIG. 10.

Summarizing the intensity and efficacy of the radial and circumferential pre-stressing of wall 14 induced by present means and method varies with the radius of the groove, the depth thereof, the distance of the groove from the hole wall 14 and the thickness of the structural member.

Dimensions 18, 20 and 22 in FIG. 1, it has been discovered, have to follow the rule reflected by the following representational table, showing minimum dimensions which must be maintained in order to realize the advantages afforded by the coining about such openings:

| Material Thickness, inches | .067″–.250″ hole diameter | | | .251″–.410″ hole diameter | | |
|---|---|---|---|---|---|---|
| | 22 | 18 | 20 | 22 | 18 | 20 |
| 3/16 | .30 | .61 | .98 | .44 | .63 | 1.13 |
| 1/4 | .34 | .67 | 1.04 | .47 | .69 | 1.19 |
| 5/16 | .37 | .73 | 1.11 | .50 | .75 | 1.25 |

It cannot be too strongly emphasized that, since the present invention involves a metal-displacement toward the wall of the hole in achieving its results, then this metal is to be displaced only by forming a circumscribing groove, and this groove must be formed by means other than milling-out, routing-out, or machining-out the groove and by means other than electrical erosion, chemical milling or any other metal working operation that involves removing metal to form the groove. Rather, the grooving is accomplished by either of two types of metal-urging or metal working or displacing operations, as desired, one type consisting of a more or less conventional die-stamping tool for forming the groove in both sides of the member as shown in FIG. 20, and the other comprising the use of a more or less conventional squeeze-dimpler type of tool as shown in FIG. 19 which can be employed to squeeze the groove in one or both faces of the member much in the conventional manner of using such a tool for dimpling.

When the structural part is rather thin, say not exceeding .067″, it is preferable to groove only the one face of the part; when the part is thicker it is necessary or preferable to groove both of the opposite major faces of the part.

In FIG. 2 there is represented the combination of subject concepts, modes and configurations with elongate apertures 24, here shown as substantially oval in shape and designated in the art as a "slot." Frequent use of such slots is made in aircraft structural members as passages for fuel transfer, lightening holes, and the like.

The following table establishes law governing the inter-relationships of slot sizes, material thicknesses, depth of the concentric oval pre-stressing groove 28, distance of groove from the nearest edge of the slot, width of groove, etc.:

| Thickness, inches | P, inches | C, inches | E, inches |
|---|---|---|---|
| .156–.250 | .009 | 1/8 | .047 |
| .251–.367 | .013 | 1/8 | .055 |
| .368–.5 | .015 | 1/8 | .058 |

In this table, P is the groove depth, C is the radial distance between the groove and the edge of the oval slot and E is the width of the groove.

However, as illustrated by means of FIG. 3, it is not mandatory that the oval apertures be completely surrounded or entirely circumscribed by a conforming concentric oval groove in order to obtain the benefits of subject invention. In fact, the central portions of the oval groove of FIG. 2 may be omitted, provided the inner ends of each of the remaining "loops" or "bights" 31 are re-curved, or directed sharply toward the slot, thus to provide horseshoe shaped grooves, one of them embracing each end of the oval apertures.

The following table establishes rules governing the interrelationship between the slot's size, the thickness of the structural member, the depth of each horseshoe groove, the distance of the inner ends of each horseshoe from the nearest edge of the slot, the width of each horseshoe groove, etc. By limiting the grooving to slot-end encompassing portions, rather than grooving around the oval slot completely, in the form of an encompassing oval groove, the less effective central portions of such an encompassing oval are eliminated. The ends of each "horseshoe" are curved somewhat inwardly toward the oval slot.

| Slot Size, inches | Material Thickness | | | | | |
|---|---|---|---|---|---|---|
| | .067"–.100" | | | .101"–.155" | | |
| | Groove Depth P, inches | Edge Distance C, inches | Width Gr. E, inches | P, inches | C, inches | E, inches |
| .010 x 1/32 | .003 | 1/32 | .009 | .003 | 1/32 | .008 |
| .3125 x 3/4 | .005 | 7/64 | .033 | .008 | 7/64 | .043 |

FIG. 4 makes a graphic display of the effects of the present invention in rehabilitating "uncoined" apertures which have been subjected to fatigue stresses. The plot to the left of the figure represents the fatigue performances, in terms of stress vs. number of cycles tension load applications until failure occurred, of monobloc structural specimens having a .25 inch diameter uncoined circular aperture in a .25 inch thick plate of 7075–T6 aluminum alloy.

The solid line to the left represents fatigue failure values of these ungrooved specimens. The solid line in the right-hand portion of FIG. 4 represents the approximation of S-N curve, of specimens, which according to the legends, have been tested to 50% and to 75%, respectively of their fatigue lives, and then "grooved" and cycled. As demonstrated by the tests represented by the rightmost line, this grooving of partially fatigued specimens proved to materially increase the fatigue life of the rehabilitated specimens over even the fatigue life of the ungrooved, virgin-metal represented by the solid line to the left.

FIG. 5 depicts the distribution of the respective radially compressive and circumferential tensile stresses developed around a hole by the present grooving and is self-explanatory, being presented as a sort of cross-sectional graph merely to further clarify the foregoing.

More specifically, concerning FIG. 5 the stress field between two circular holes grooved according to this invention, there is graphically demonstrated the residual stresses or stress-reversal preventing pre-stressing created by the grooves in thousands of pounds per square inch. By stress reversal, is meant that the hole wall would yield and crack.

Significant demonstrations by this graph are the facts that the residual radial compressive or negative stress induced in the area surrounding the hole wall decreases up to a certain critical point as one proceeds from the groove toward the wall and then increases and that the same is true of the circumferential stresses on this wall. These circumferential residual forces are shown as increasing generally parabolically as one goes from the groove toward the hole wall.

As a consequence, it is manifest from the graph that under the axial or tensile loads on the apertured member the members have their potential failure nucleus shifted far out away from the hole. In fact, tests have repeatedly demonstrated that fatigue failure is less likely to occur at the grooved hole, or in the area 38, than elsewhere in the structural part, by virtue of the present invention.

In FIG. 6 the application of the invention to marginal portions that include hiatuses in the adjacent edge, or may under stress develop these nicks, that must be prevented from deepening and/or widening, is depicted. That is, the invention also can be used to prevent the formation of such hiatuses. This "edge-grooving" variant of the invention is, at present, particularly applicable to such stressed structural members as the metallic window frames 32 of high speed pressurized, transport aircraft. Because of fuselage working, buffeting, etc., or due to the inadvertent mishandling of tools in installing or removing window panes, etc., nicks, notches or other hiatuses may well be formed in the inner edge of the window frame. Under strain, these notches may well widen, deepen, and elongate with ultimate serious consequences to the window in the pressurized fuselage.

The present invention displaces metal toward the apex of the V-notches 34, pre-stresses them in this critical area and prevents the enlargement or even the formation of these hiatuses, thus precluding blow-out of pressurized windows. However, it is to be definitely understood that this edge-grooving aspect of this invention is by no means limited to use as just aforesaid, since it can be employed to reinforce, protect or rehabilitate the edge of any metallic part.

In forming the edge-groove 36 a grooving tool, such as that shown in FIG. 7 and having a pair of opposed grooving rollers 100, a guide 101, and groove depth adjustment means 102, may well be employed. The part is inserted between said rollers and the adjustment means is tightened. A trigger 103 is actuated that permits the air-powered tool to roll along the desired edge, press-forming the groove as it goes. The ends of the finished groove 36 must meet perfectly so that the progress of the grooving rollers must continue past the locus where the groove was initiated. If there are circular or other grooved apertures in the frame, the groove should not approach closer than 1/16 inch to any aperture.

In FIG. 8 the vital relationship of the distance of the groove from the hole edge to the radius of the present groove, whether the groove is formed around a circular, an oval or a notched aperture, is presented.

The line 50 is the resultant of plotting optimum groove radii against groove distance from the hole wall. Upon mathematical analysis of line 50, it is found to satisfy the equation $C = .07 + .6R \pm .03$, wherein C is the groove distance from the hole and R is the groove's radius. The hatched areas represent the tolerance limits of R and C, approximately. Thus it is apparent that there is a linear relationship between the radius of each groove and the distance of the groove from the hole edge and that this relationship satisfies the finite equation as set forth.

In FIG. 9 there is plotted against the thickness of the structural member, the minimum feasible radius of the groove, the optimum radius, and the maximum radius usable in forming the groove. It will be observed that all these plots follow the linear relationships set forth hereinabove, and that the radius of the groove is increased as the material thickness is increased according to a linear equation.

FIG. 10 graphically represents the effects of tolerances percentage departures from the preferred relationship between groove depth and material's thickness, here employing a groove radius of .040 inch by way of example. The plots are established empirically and represent areas of tolerance, or variations, permissible. It is observable that here, too, a linear relationship exists.

In FIG. 11, the groove radius was enlarged to .080 inch and tolerances of 4, 5 and 6% were employed, giving the plots of permissible variation in depth vs. thickness.

Both FIG. 10 and FIG. 11 wil be seen to serve to demonstrate the general applicability of the laws set forth above.

It is to be well noted that the linear equations set forth herein are "special cases" of the general relationship between the essential variables relating to radius of groove, depth of groove and thickness of material that are set forth in rules (1), (2), (3), and (4) above.

In FIG. 12, the effect of hole edge clearance, C, above, on the residual stress created at the hole-edge is graphically demonstrated. In the upper, or curvilinear line, C was fixed at 3/32 inch with a 1/4 inch hole, while the groove depths were increased as shown on the abscissae. The consequent variations in residual stress are plotted on the ordinate and will be seen to rise substantially rectilinearly up to a groove depth of the order of .0028 inch, whereat they deflect.

The other rectilinear line represents or shows the increase in residual stress at the edge of the hole where the groove depth is increased, the distance C being fixed at 11/32 inch. It will be observed that the residual stress increased as a straight line function as the depths were increased to .014 inch, rather than tapering off as was experienced with the lesser value of $C=3/32$ inch.

In displacing the surface layer of the metal part bodily and radially toward the hole, naturally some of the displaced metal at the ends of the hole will be forced into the confines of the hole, forming overhangs or lips. In order to provide a better and complete bearing surface of the wall of the hole throughout its entire length, it is advisable to remove this excess metal. This removal is usually effected by reaming, leaving the hole wall a perfect cylindric surface, but of course other means and modes than reaming may be employed to this end, if desired. In any event, the removal diminishes none of the advantages achieved by this invention, but does, as aforesaid provide a continuous, clear, cylindric surface as the hole wall itself, rather than a barrel-sectioned hole wall.

In most structural metal practice, it is common when a crack or fracture develops therein, to check its further propagation longitudinally, by drilling a "stop hole" at its largest end. This invention obviates this practice by the simple procedure of forming one of the present horseshoe grooves at this end, or at both ends, of the crack, as shown in FIG. 21, which effectively checks the spread or enlargement of the crack, for the reasons set forth in connection with its other usages aforesaid.

Fatigue tests were made on the grooved bolt holes which were then drilled oversize. Shop errors, or engineering changes, may require that a hole be reworked and drilled oversize after the initial hole has been provided with a groove. These tests clearly demonstrate that no material loss in fatigue life of the member results so long as the groove itself is not eradicated, as by a re-drilled hole of a diameter exceeding that of the circular groove. However, it is true that the ratio of fatigue-life improvement does decrementally change as the re-drilled hole diameter is increased, as shown by the following table:

| Material Thickness, inches | Initial Hole Size (grooved), inches | Enlarged or Reworked hole size, inches | "C" Dimension, inches | Ratio of Fatigue Improvement |
|---|---|---|---|---|
| 0.25 | 0.156 | 0.203 | 0.083 | 12 |
| 0.25 | 0.187 | 0.203 | 0.083 | 11.7 |
| 0.25 | 0.156 | 0.219 | 0.075 | 18.0 |
| 0.25 | 0.187 | 0.219 | 0.075 | 11.7 |
| 0.25 | 0.156 | 0.250 | 0.059 | 11.7 |
| 0.25 | 0.187 | 0.250 | 0.059 | 3.8 |
| 0.25 | 0.156 | 0.312 | 0.028 | 6.3 |
| 0.25 | 0.187 | 0.312 | 0.028 | 5.3 |
| 0.25 | 0.156 | 0.368 | 0.0005 | 3.6 |
| 0.25 | 0.187 | 0.368 | 0.0005 | 1.9 |

In FIG. 13, it is graphically demonstrated that the hole-edge compressive stress varies directly with the ratio of the width of the structural member to the diameter of the annular groove's circular centerline. This beneficial stress increases, generally speaking, as this ratio is increased and as the groove depth increases with a given thickness and composition of material.

In FIG. 14 it is demonstrated that an increase in the actual thickness of the member generally effects an increase in this residual stress, as does an increase in groove depth.

In FIG. 15, the diameter of the hole itself is shown to have a significant effect upon the subject residual stress, the plan size, depth and radius of the groove being constant. For, this graph, made by means of photoelastic-stress data, demonstrates that as the hole-diameter increases, the desired residual stress decreases, in a direct linear proportion.

In FIG. 16, the hole-pattern aspect of the invention is made manifest. Here, there are lines of holes of equal diameter, each circumscribed by one of the present grooves. However, the holes in one row are staggered with respect to those in the parallel, adjacent row; the varying degrees of beneficial radial compressive stresses at various quadrantal points of each hole are plotted adjacent these points. The groove dimensions were of fixed value and the stresses varied as shown. It is to be observed that the parallel rows of holes were so spaced mutually apart that the coinings of vertically adjacent holes did not affect each other.

In FIG. 17, another hole-pattern study is displayed, the holes not being staggered and the groove depth being the same. It should be noted, however, that the spacing of holes in each of the rows was made smaller than in FIG. 16. As a consequence, the stress was found to be smaller at horizontal quadrantal points, A and C, than at vertical such points, B and D, as compared with FIG. 16.

In FIG. 18 there is displayed the effect of specimen width upon the stress distribution in the surface of the specimen in the regions lying just outside, or radially beyond, the outer periphery of the coining groove. A 3/4 inch hole was employed and a fixed groove depth of about .010 inch was utilized. It will be observed that this circumferential tensile stress decreases as one progresses from the groove toward the adjacent edge of the specimen.

One employable form of tool for forming circular grooves around circular holes is diagrammatically illustrated in FIG. 19. It is a more or less conventional "squeeze dimpler" type of tool and hence needs no detailed description. However, it is shown as comprising essentially, a yoke 110 between the arms of which are mounted an anvil die, or back-up unit as the case may be, 111, a movable die unit 112 and controllable power applying means 113 all arranged and functioning substantially as is conventional except that the two dies consist of hollow center male dies of circular conformation to produce circular grooves surrounding the circular hole, 114, in the work piece. The "C" distance and radius of groove is predetermined in the dies and the depth of the groove is controlled by controlling the time and amount of power applied, as is obvious in such squeeze-devices.

In FIG. 20, there is illustrated, more or less diagrammatically a hand-tool for impact-grooving around circular holes. It will be seen to consist essentially of a conventional rivet-gun 200 with a circular edged male die 201 rather than a rivet-set but, since only one side of the work piece is being grooved, also employing the usual back-up bar 202. It is applied and operated substantially as is an ordinary rivet gun, the depth of the groove being controlled by inspection and by control of the duration and intensity of the force applied.

In FIG. 21, a structural member 205 has developed a crack 206, the propagation of which this invention halts by means of one of the horseshoe grooves 207 formed as hereinabove described.

Although, for the sake of concreteness, certain arithmetical values and other specificities have been employed hereinabove by way of example, it is to be well understood that the actual scope of the invention is limited only by the ambit of the subjoined claims.

I claim:

1. A method of neutralizing fatigue-causing stress concentration in the wall of a discontinuity in a structural member, comprising: grooving the structural member on its face adjacent said wall by compressively displacing the material of the structural member toward the periphery of said wall; and continuing said displacement to an extent sufficient to create a fatigue resistant residual radial compressive stress in the area between the inner periphery of the groove and the edge of the discontinuity, said stress being directed toward the center of said discontinuity.

2. A method of increasing the fatigue-strength of a metallic structural member having a hiatus therein, comprising: forming a groove in at least one face of the member by displacing of metal toward the hiatus thereby to form a residual compressive area around the hiatus, said area including an overhang of excess, displaced metal at the exterior end of the wall of the hiatus, and removing the excess, overstressed metal overhanging said hiatus.

3. A method of minimizing stress-concentration about the periphery of the wall of an aperture in a metallic member that includes a surface shell, comprising: compressively indenting in the shell, only, of a major face of an apertured metallic member, an annular hiatus encompassing the aperture, said hiatus being spaced radially outwardly away from the aperture, thereby bodily displacing, substantially parallel to itself, that portion of the shell lying between the annular compressed hiatus and the wall, said displacement being directed toward the aperture's wall at the outer end only of the aperture, while leaving the major portion of the surface of the piece generally in its original plane and unbent; and continuing the aforestated action to create in the peripheral wall of the aperture, at its outer end, and in the shell-area, between the annular compressed hiatus and said outer end, a radially-inwardly and horizontally or coplanarly directed compressive stress that is neutralizingly resistant to fatigue forces acting on said apertured metallic member.

4. A method of minimizing stress-concentration about the periphery of the wall of an aperture in a metallic member that includes a surface-shell, comprising: compressively indenting in the shell, only, of a major face of an apertured metallic member; an arcuate hiatus at least partially encompassing the aperture, said hiatus being spaced radially outwardly away from the aperture; and bodily displacing, substantially parallel to itself, that portion of the shell lying between the annular compressed hiatus and the wall, the displacement being directed toward the wall at an outer end, only, of the aperture, while leaving the major portion of the surface of the piece generally in its original plane and unbent; and continuing the aforestated action to create in the peripheral wall of the aperture, at its outer end, and in the shell-area, between the arcuate hiatus and said outer end, a radially-inwardly and horizontally or coplanarly directed compressive stress that is neutralizingly resistant to fatiguing forces acting on said metallic member; the displaced shell-area aforesaid initially including a metallic lip protruding diametrally and circumferentially over said apertures as an overhang at the outer end of said aperture; and removing said lip and restoring the aperture to its original diametral dimension throughout its axial extent.

References Cited in the file of this patent

UNITED STATES PATENTS

| | | |
|---|---|---|
| 1,502,873 | Oberg | July 29, 1924 |
| 1,848,786 | Lampart | Mar. 8, 1932 |
| 2,178,918 | Reiter | Nov. 7, 1939 |
| 2,197,609 | Cornell | Apr. 16, 1940 |
| 2,560,505 | Dean | July 10, 1951 |
| 2,648,895 | Davis | Aug. 18, 1953 |
| 2,822,068 | Hendrix | Feb. 4, 1958 |
| 2,887,762 | Dobell | May 26, 1959 |